Figure 1:
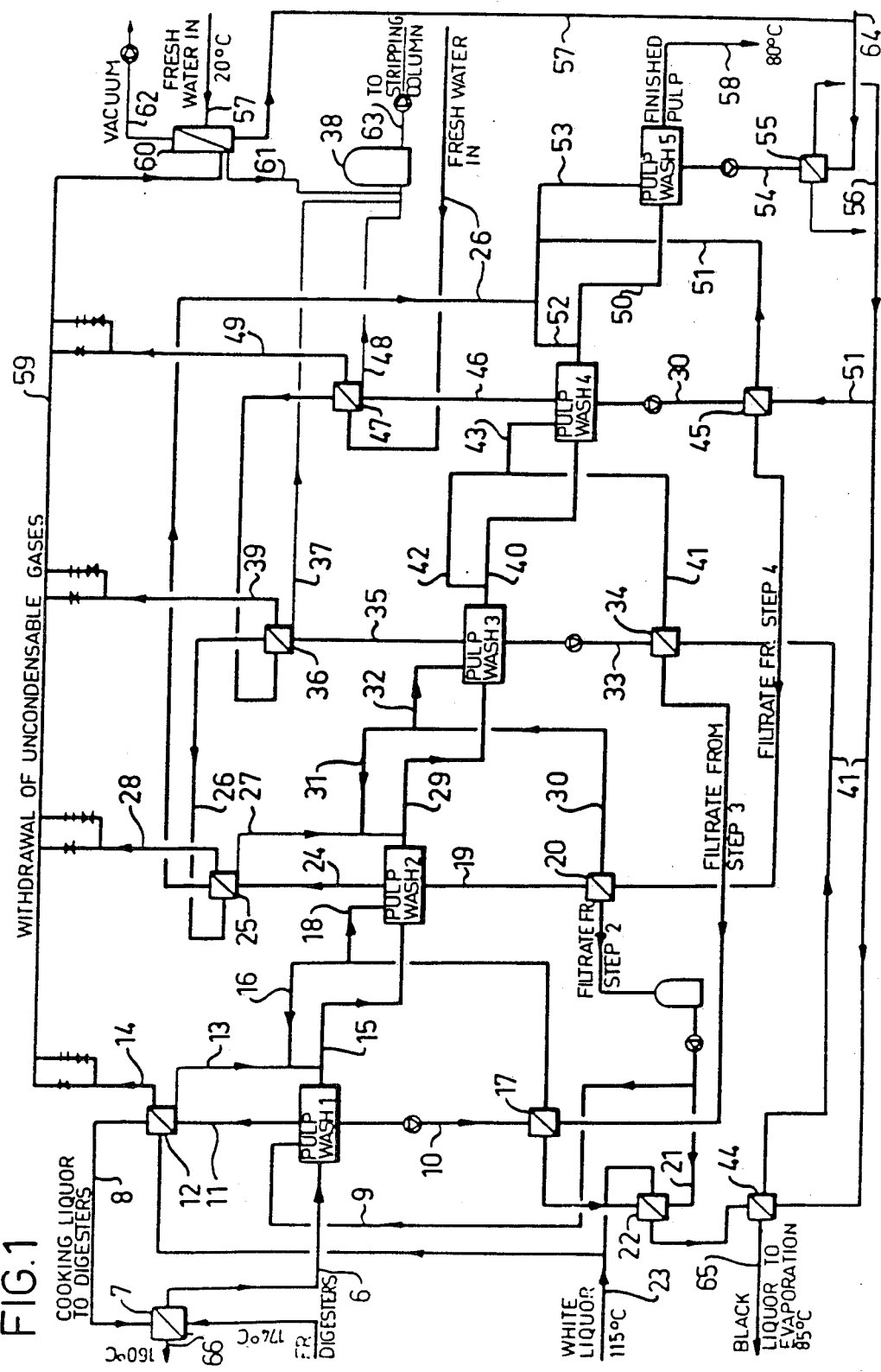

United States Patent [19]

Andersson

[11] Patent Number: 4,595,456
[45] Date of Patent: Jun. 17, 1986

[54] PULP WASHING PROCESS

[76] Inventor: Alf O. Andersson, 38 Kofallsvägen, S-710 40 Frövi, Sweden

[21] Appl. No.: 680,335

[22] PCT Filed: Apr. 11, 1983

[86] PCT No.: PCT/SE84/00132
§ 371 Date: Nov. 20, 1984
§ 102(e) Date: Nov. 20, 1984

[87] PCT Pub. No.: WO84/04114
PCT Pub. Date: Oct. 25, 1984

[30] Foreign Application Priority Data

Apr. 13, 1983 [SE] Sweden .................................. 8302047

[51] Int. Cl.$^4$ ............................................. D21C 11/06
[52] U.S. Cl. .......................................... 162/47; 162/60
[58] Field of Search ........................ 162/42, 45, 60, 47, 162/242, 249, 250; 8/156

[56] References Cited

U.S. PATENT DOCUMENTS 4,154,644  5/1979  Ericsson ................................ 162/60
4,279,126  7/1981  Rosenblad ............................ 60/651
4,310,384  1/1982  Meredith et al. ..................... 162/60

FOREIGN PATENT DOCUMENTS 627476  9/1961  Canada ................................... 162/47

Primary Examiner—Peter Chin
Attorney, Agent, or Firm—Burns, Doane, Swecker & Mathis

[57] ABSTRACT

The invention relates to a process for the washing of pulp with a maximum recovery of energy, the pulp after digestion being washed in a plurality of successive washing steps at a pressure above atmospheric in at least one of the steps and washing filtrate from a following step or fresh water being used as diluting and washing liquid in a given step. The outgoing washing filtrate from a washing step should be heat exchanged against incoming diluting and washing liquid to the subsequent step and a part of the filtrate (21) from the second step should be heat exchanged against washing filtrate (10) from the first step and then be combined with cooking liquor (23) for the digestion of the pulp. As diluting and washing liquids in the last two steps (4, 5), fresh water is used, which has also been heat exchanged against outgoing washing filtrate (54, 10) from the last and the first washing step. The gases leaving the washing steps are heat exchanged (25, 36, 47) against fresh water, which is then used as the diluting and washing liquid in the last step, the gases (11) from the first step however being heat exchanged against cooking liquor (8) for the digestion process. The condensates (13, 27) obtained from the heat exchange of the gases in each step are combined with the diluting liquid to the following step except for the steps in which fresh water is used as the diluting liquid. The resulting uncondensable gas fractions after the heat exchange are combined (59) and are finally heat exchanged once more (60) against incoming fresh water (57). The pulp (6) obtained from the digestion process is also (7) heat exchanged against the cooking liquor (8) which is led to the digestion process.

4 Claims, 3 Drawing Figures

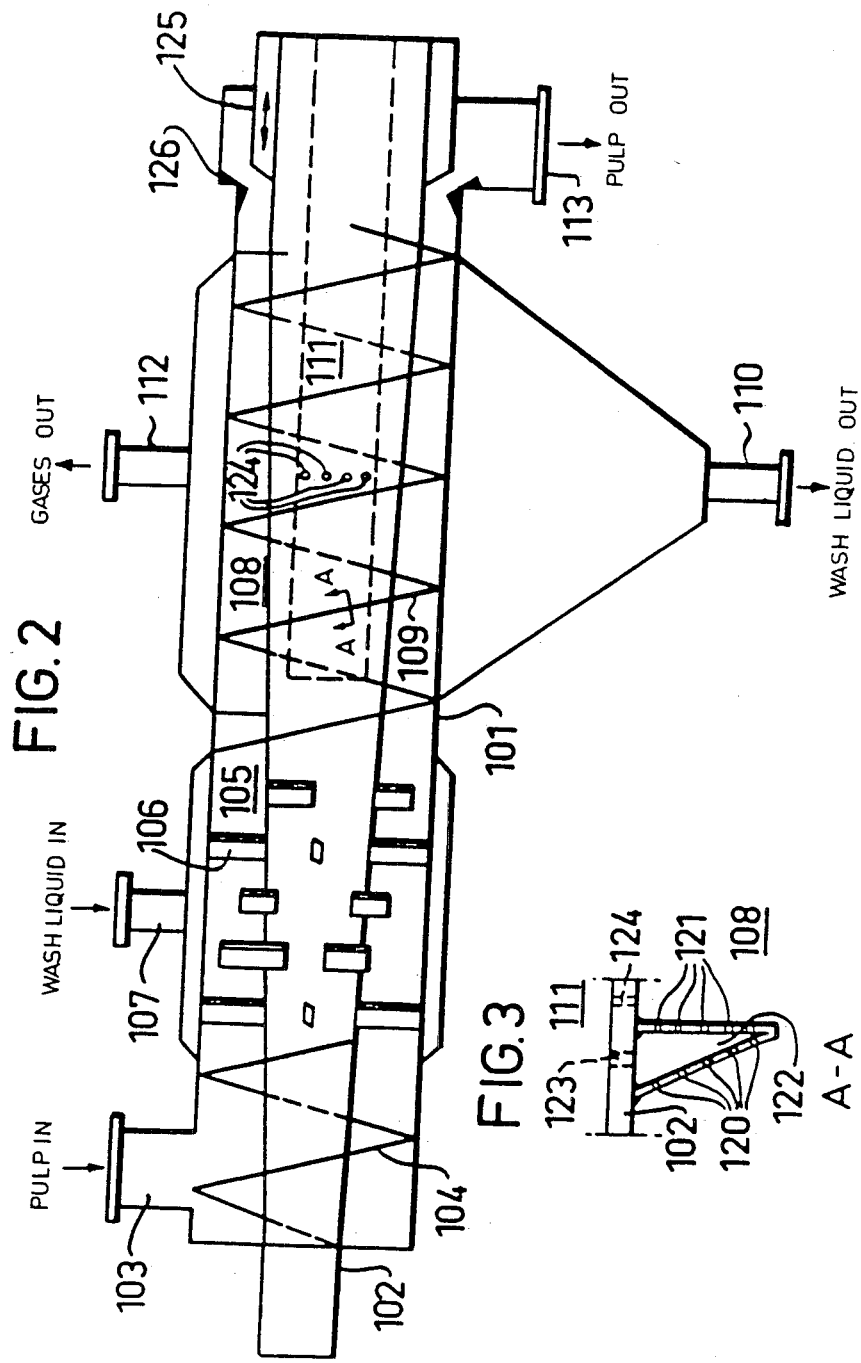

PULP WASHING PROCESS

This invention relates to a process for the washing of pulp with a maximum recovery of heat energy and chemicals from the digestion liquor.

In the preparation of semi-chemical and chemical pulp, wood chips are digested with a digesting liquor which is selected depending on which type of pulp is intended to be prepared. After digesting, a considerable part of the organic and inorganic components of the digesting liquor remain mixed with the resulting pulp and must be removed therefrom. The pulp and the digesting liquor are separated by washing in a suitable way and the resulting liquor is thereafter mostly evaporated in order to recover the heat values of dissolved organic wood substance and to recover inorganic digesting chemicals for repeated use in the digestion. The washing is also usually carried further than what is justified by an economical recovery of chemicals in order to give the least possible discharges from the pulp mill to the recipient. In most cases, the maximum allowed discharge amounts are stipulated by authorities.

In the washing of pulp, the economical problems in connection with the recovery of chemicals and the environmental problems om minimizing discharge from the plant have so far been given most consideration. The problems of the energy losses arising in the washing process have attracted less attention. With increasing energy costs, however, these problems have become more and more important economically, and it has turned out to be highly desirable to minimize as much as possible the energy losses in the washing process as well as in the other partial processes of the pulp preparation. A total treatment of the whole washing process in this respect has so far been lacking. The present invention eliminates this disadvantage. This invention provides a process for washing of pulp with a maximum recovery of heat. The pulp is washed after the digestion in a plurality of successive washing steps at a superatmospheric pressure in one or more of the steps, and washing filtrate from a following step is used as a liquid for dilution and washing in a given step. The invention is characterized in that (a) outgoing washing filtrate from a washing step is heat exchanged against diluting and washing liquid going into the subsequent step;

(b) a part of the filtrate from the second washing step is heat exchanged against the filtrate coming from the first step and is then combined with the digestion liquor conveyed to the pulp digestion process;

(c) fresh water is used as the diluting and washing liquid in the last two steps, said water also having been heat exchanged against outgoing washing filtrate from the last and the first washing step;

(d) gases leaving the washing steps are heat exchanged against fresh water which is then used as the diluting and washing liquid in the last step, except the gases from the first step, which are heat exchanged against the cooking liquor to the pulp digestion process, the condensates from the gases resulting from each step being combined with the diluting liquid to the following step except in the steps in which fresh water is used as the diluting liquid;

(e) the uncondensable gaseous fractions resulting from the washing steps are combined after the heat exchange and are finally heat exchanged once more against incoming fresh water, and (f) the system of pulp coming from the digestion to the first washing step is heat exchanged against the cooking liquor for the pulp digestion process.

By the process of the invention, the heat contents of the pulp and the cooking liquor from the digestion process will be utilized maximally for heating the incoming cooking liquor and the diluting and washing liquids used in each step, inclusive of the supplied fresh water. In this way, diluting and washing liquid of the most suitable liquor strength and temperature will be used in each of the washing steps. Because of this, the efficiency of the washing process will also increase and the dilution factor in washing will be reduced, which further contributes to improving the economy of the washing process. However, the most important advantage is the saving of energy which may amount to 80–85% as compared to the energy consumption in previously known washing systems.

The invention is illustrated more in detail in the accompanying drawing, in which FIG. 1 shows a block diagram of a washing process according to the invention.

FIGS. 2 and 3 show schematically an embodiment of a washing aparatus which has been found to be particularly suitable for use according to the invention.

FIG. 1 shows a complete flow diagram of a washing process in accordance with the invention. The diagram specifically shows washing of pulp from a sulfate process, but it is realized that the invention is equally applicable to washing of pulp from other types of pulping processes. The small changes of equipment then required will be obvious to one skilled in the art.

The washing system shown comprises five washing steps, which are generally marked in the drawing with 1, 2, 3, 4 and 5. In practice washing in five steps has been found to be suitable, as the washing losses will then be so small that the washing filtrate from the last step can then be discharged directly to the recipient without disturbing the environment. However, it is of course possible to use more or fewer washing steps and to obtain substantially the same heat economy.

The pulp is conveyed from the digesters through the conduit 6 and is first heat exchanged in the heat exchanger 7 against the cooking liquor led to the digesters through the conduit 8. In the washing step 1, the pulp is washed at an elevated temperature and a pressure above atmospheric pressure by squeezing, preferably in a screw press of a design shown in the following. Weak liquor obtained as a washing filtrate in the washing step 2 is supplied as a washing liquid through the conduit 9. In the washing process, a filtrate of black liquor is obtained which is carried away through the conduit 10 to be evaporated after heat exchange in a plurality of steps. Furthermore, a gaseous fraction is obtained which is carried away through the conduit 11 and is heat exchanged in the heat exchanger 12 against the cooking liquid led to the digesters through the conduit 8. In this heat exchange, a condensate is obtained which is combined through the conduit 13 with the diluting liquid for the following washing step 2, and an uncondensable gas fraction which is led away through the conduit 14. It is here intended by the expression "uncondensable" that the gas fraction does not contain components which condense under normal technical conditions in the plant. In practice, the gas fraction will contain small amounts of such components as steam, turpentine, methanol etc. which are condensable per se but have not been completely condensed in the previous heat exchanger. This also applies to the gas fractions obtained in the subsequent washing steps.

The washed pulp from the washing step 1 is discharged through the conduit 15 to the step 2 and is diluted with diluting liquid which consists of the weak liquor obtained as washing filtrate from the washing step 3. This washing filtrate is supplied through the conduit 16 after being heat exchanged in the heat exchanger 17 against the outgoing black liquor as the washing filtrate from the washing step 1. The same weak liquor from the washing step 3 is also used as the washing liquid in the washing step 2 and is supplied through the branch conduit 18.

In the washing step 2, which preferably also consists of a screw press, the pulp is washed at an elevated temperature and at a pressure above atmospheric pressure with the weak liquor from the washing step 3, supplied through the conduit 18. A washing filtrate is then obtained, which is carried away through the conduit 19 and is heat exchanged in the heat exchanger 20 against the washing filtrate from the washing step 4 which is to be used as diluting and washing liquid in the washing step 3. The filtrate is then led through the conduit 9 to the washing step 1 to be used there as washing liquid. A part thereof, however, is drawn off through the branch line 21, is heat exchanged in the heat exchanger 22 against the black liquor obtained as a washing filtrate from the washing step 1 and is then combined with white liquor which is supplied through the line 23, in order to be led thereafter as cooking liquor to the digesters via the heat exchanger 7. The gas fraction obtained from the washing step 2 is carried off through the conduit 24 and is heat exchanged in the heat exchanger 25 against fresh water which is supplied through the conduit 26. A condensate is then obtained which is removed through the conduit 27 and is combined with the diluting liquid supplied to the pulp from the washing step 2, and an uncondensable gas fraction which is carried away through the conduit 28.

The pulp is led from the washing step 2 through the conduit 29 to the step 3, and diluting liquid is added to it through the conduit 31. The diluting liquid comprises washing filtrate from the washing step 4 and is supplied through the conduit 30 after being heat exchanged in the heat exchanger 20 against the washing filtrate from the washing step 2. The conduit 30 is then divided into the branches 31 for diluting liquid to the pulp in the conduit 29, and 32 for washing liquid to the washing step 3.

In the washing step 3 which preferably is a screw press in the same way as in the previous steps, the pulp is also preferably washed at an elevated temperature and at a pressure above atmospheric pressure with washing filtrate from the washing step 4 supplied through the conduits 30 and 32. A washing filtrate is then obtained which is led away through the conduit 33 and is heat exchanged in the heat exchanger 34 against fresh water and thereafter in the heat exchanger 17 against the black liquor obtained as washing filtrate from the washing step 1, after which it is added as diluting and washing liquid to the pulp from the washing step 1 and in the washing step 2, respecively. Moreover, a gaseous fraction is obtained which is carried off through the conduit 35 and is heat exchanged in the heat exchanger 36 against fresh water through the conduit 26. A condensate is then obtained which is carried away trough the conduit 37 to a condensate separator 38, and an uncondensable gas fraction, which is carried off through the conduit 39. The condensate in the conduit 37 is not combined, as in the previous steps, with diluting liquid to the outgoing pulp as the diluting liquid there is to be fresh water.

The pulp is conveyed from the washing step 3 through the conduit 40 to the washing step 4. Diluting liquid is added through the conduit 42 to the pulp in the conduit and diluting liquid is added in the washing step 4 through the conduit 43. In this case the diluting and washing liquids consist of fresh water which is supplied through the conduit 41 after being heat exchanged in the heat exchanger 34 against ghe outgoing washing filtrate from the washing step 3 and before this in the heat exchanger 44 against the black liquor led to the evaporation.

In the washing step 4, the pulp is washed with fresh water through the conduit 43, a washing filtrate being obtained which is carried away through the conduit 30. This washing filtrate is heat exchanged in the heat exchanger 45 against fresh water and then in the heat exchanger 20 against washing filtrate from the washing step 3, after which it is supplied as diluting and washing liquid through the branch lines 31 and 32 to the pulp being washed in the washing step 3. The gaseous fraction from the washing step 4 is carried away in the conduit 46 and is heat exchanged in the heat exchanger 47 against fresh water in the conduit 26. A condensate is then obtained which is led via the conduit 48 to the condensate separator 38, and an uncondensable gas fraction which is led away through the conduit 49.

The pulp is led from the washing step 4 through the conduit 50 to the final washing step 5. The pulp is then diluted with fresh water through the conduit 52 and washed in the washing step 5 with fresh water through the conduit 53. The fresh water used for this dilution and washing is supplied through the conduit 51 after being heat exchanged in the heat exchanger 45 against the washing filtrate from the washing step 4, and through the conduit 26 after being heat exchanged in the heat exchangers 25, 36, 47 against the gas fractions from the washing steps 2, 3 and 4, respectively. The washing filtrate from the washing step 5 is led away through the conduit 54 and is heat exchanged in the heat exchanger 55 against incoming fresh water in the conduit 56 and is then discarded or treated in some other way. The pulp finally washed is taken off throgh the conduit 58 and conveyed to screening or further treatment. No gas fraction is recovered from the final washing step, which most often operates at atmospheric pressure.

In a variant of the process, the pulp can be subjected to refining between two of the washing steps 2–4, and after this refining screening under pressure can be carried out between two of the washing steps 2–4. A pulp can then be obtained which is treated such that it is completely finished when leaving the last washing step and can be directly conveyed to a storage tower or the like.

The uncondensable gas fractions from the washing steps 1, 2, 3 and 4 are combined after the heat exchange to the collecting line 59 and are led to the heat exchanger 60 where they are heat exchanged against incoming fresh water in the conduit 57 after which they are drawn away through the conduit 62 to be treated further, e.g. burned, in order to eliminate the odor. The condensate formed in the heat exchanger 60 is led away through the conduit 61 to the condensate separator 38 and the condensates combined there from the heat exchangers 36, 47 and 60 led away through the conduit 63, e.g. to a stripping column, for elimination of odorous components.

The incoming fresh water is supplied through the conduits 26, 57 and 64. Fresh water is supplied through the conduit 26 and is then heat exchanged successively against the gas fractions from the washing steps 4, 3 and 2 in the heat exchangers 47, 36 and 25, respectively. This water is thereafter led to the branch lines 52 and 53, where it is used as diluting and washing water for the washing step 5. Fresh water is also supplied through the conduit 57, is heat exchanged in the heat exchanger 60 against the combined uncondensable gas fractions and is then combined with incoming fresh water in the conduit 64. This water is then heat exchanged against the washing filtrate from the washing step 5, after which a part thereof is discharged through the branch line 51, is heat exchanged against the washing filtrate from the washing step 4 in the heat exchanger 45 and is then used as diluting and washing water in the washing step 5 together with the fresh water from the conduit 26. The other part of the fresh water from the conduit 56 is led through the branch line 41 to heat exchange in the heat exchanger 44 against the outcoming black liquor to be evaporated and which simultaneously is the washing filtrate from the washing step 1. This water is thereafter heat exchanged in the heat exchange 34 against the outcoming washing filtrate from the washing step 3 and is then used as diluting and washing liquid in the washing step 4.

The outgoing black liquor to be evaporated is, as mentioned above, taken out, as washing filtrate from the washing step 1 and is then heat exchanged successively in the heat exchanger 17 against washing filtrate from the washing step 3, in the heat exchanger 22 against a part of the washing filtrate from the washing step 2, which filtrate is then combined with incoming white liquor for the digestion, and in the heat exchanger 44 against incoming fresh water. The black liquor is then conveyed away to evaporation through the conduit 63.

The white liquor to be used in the digestion process is supplied through the conduit 23 and is combined, as indicated above, with a part of the washing filtrate from the washing step 2. It is then first heat exchanged in the heat exchanger 12 against the gas fraction from the washing step 1 and thereafter in the heat exchanger 7 against the incoming unwashed pulp from the digestion, after which it is led through the conduit 66 to the digestion process.

In FIGS. 2 and 3, an embodiment of a washing apparatus is shown schematically which has been found to be very suitable in the process of the invention. FIG. 2 shows a schematic view of the washing device and FIG. 3 shows a sectional view of a detail along A—A in FIG. 2.

According to FIG. 2, the washing apparatus consists of a screw press with a housing 101 and a through-going shaft 102, which supports different means for treatment of the pulp. The shaft is rotated by driving means not shown.

The pulp is fed into the housing 101 through the inlet 103 and is fed forwards by means of the screw thread 104 to part 105 of the housing where the shaft 102 is provided with wings 106. These wings serve to mix the pulp with washing liquid which is supplied through the intake 107, so that a good washing of the pulp is obtained. In this region 105 of the housing, the pulp is not subjected to any considerable compression but it is intended to obtain the best possible contact between the pulp and the washing liquid.

The pulp is then transferred to the region 108 of the housing 101. In this region, the shaft 102 is made conical with an increasing diameter and is provided with one or more screw threads 109 of an embodiment shown more in detail in the following. The pulp will in this way be strongly compressed in said region at the same time as it is moved forwards toward the housing.

In the region 108, the inside of the housing 101 is designed as a strainer plate having liquid connection to the outlet 110, and consequently pressed-out washing filtrate can escape through the outlet 110. Moreover, as is shown more in detail in FIG. 3, the screw threads are made hollow and in liquid connection with the region 108 and also with the interior space 111 of the shaft 102, which is made hollow in the region. Thus, the washing filtrate can also escape through the screw threads 109 to the cavity 111 and from this through a connection not shown be combined with the washing filtrate from the outlet 110. The shaft 102 should be provided with strainer holes to the interior chamber 111. These strainer holes are arranged between the screw threads 109 in the compression space 108 and some of them are shown at 124. The number of such strainer holes is of course considerably greater than that shown in the figure.

At the outlet end of the compression space 108, the shaft 102 can also be provided with a sleeve 125, which is movable in axial direction as is indicated by the double arrow. The sleeve 125 interacts with a stop 126 such that the space between the sleeve and the stop can be varied. The pressing force can be varied in this way and consequently the dewatering degree of the pulp coming from the washing step. The position of the sleeve 125 can be controlled by means of suitable controlling means which are not shown in the figure but are well-known to those skilled in the art.

The gaseous fraction obtained at the compression is carried away through the outlet 112.

The pressed-out pulp is finally conveyed out through the outlet 113 and onwards for further treatment in a following washing step or for screening.

FIG. 3 shows a detail in section of the screw thread 109 in FIG. 2. It can be seen that the thread is made hollow with a plurality of holes 120, 121, by which the outer space 108 in the housing 101 is in connection with an interior space 122 in the thread. The space 122 in the thread is in its turn in connection with the interior cavity 111 in the shaft 102 through one or more holes 123. In this way liquid can thus be pressed out of the pulp in the space 108 through the holes 120, 121 to the space 122 and from there through the holes 123 to the space 111 in the hollow shaft 102. Furthermore, one of the strainer holes through the shaft is also shown at 124.

A screw press of the type shown is especially suitable for washing of pulp at a pressure above atmospheric pressure and at an elevated temperature, also then above the normal boiling point of water. At the treatment of the pulp in the screw press, there will be a pressure drop, and after a number of steps the pressure has decreased to atmospheric pressure. However, it should be noted that the washing of the pulp need not necessarily take place at an overpressure in all the steps of the system but one or more washing steps can operate at atmospheric pressure. What is desired is that the highest possible dry content of the outgoing pulp should be obtained in all the washing steps, and this in order that the washing filtrates should have the highest possible content of the digestion chemicals.

Calculated values of temperature and pressure in operation of a plant of the type shown schematically in FIG. 1 are indicated in the following table. The indicated values of the pressures are absolute values.

| | Temp., °C. | Pressure, Bars |
|---|---|---|
| Incoming pulp from the digester | 174 | 9,0 |
| Outgoing digestion liquor to the digesters | 160 | |
| Incoming pulp to washing step 1 | 145 | 4,24 |
| Outgoing filtrate from washing step 1 | 135 | 3,2 |
| Incoming pulp to washing step 2 | 130 | 2,75 |
| Outgoing filtrate from washing step 2 | 120 | 2,03 |
| Incoming pulp to washing step 3 | 116 | 1,8 |
| Outgoing filtrate from washing step 3 | 112 | 1,57 |
| Incoming pulp to washing step 4 | 108 | 1,67 |
| Outgoing filtrate from washing step 4 | 105 | 1,23 |
| Incoming pulp to washing step 5 | 90 | 1 |
| Outgoing filtrate from washing step 5 | 80 | 1 |
| Outgoing pulp from washing step 5 | 80 | 1 |

The heat exchangers used in the system are in all cases of a conventional design. It is realized that they can be of a different construction depending on the materials which are heat exchanged against each other, such as the heat exchanger 7 where incoming hot pulp is heat exchanged against outgoing hot cooking liquor, and the heat exchanger 47 where a moderately hot gas fraction is heat exchanged against incoming fresh water having a temperature close to room temperature. However, there are no difficulties for one skilled in the art to select for each application a suitable heat exchanger of a known type and of suitable dimensions.

Suitable conveyors, pumps and valves of types well-known to one skilled in the art are used for a correct feeding of the various material such as pulp, washing filtrate and diluting and washing liquids in the system. These devices have not been shown, either, in the block scheme in FIG. 1 and it is quite within the competence of one skilled in the art to select suitable devices and the places where they are to be inserted. The same thing also applies to other equipment such as condensate separators and the necessary measuring and control equipment. The choice of material for the various devices included in the system is determined by the composition in each specific case of the treated materials and the solutions, and this is also within the experience and competence of one skilled in the art.

Through the process of the invention, the pulp is washed at a high temperature and in each washing step a higher dry content of the pulp is obtained than could be obtained earlier. Because of this, a pulp is obtained where the problems of odor and taste will be much reduced. The dilution factor in washing can be reduced by at least 10-30% and a total saving of energy can be obtained amounting to about 80-85% relative to systems presently known. Besides, savings in energy should also be obtained in the evaporation of liquor.

The invention has been illustrated in the present specification with reference to a specific embodiment in a sulfate process and using a special type of washing apparatus. However, it is to be noted that the invention is not restricted merely to the embodiments shown but that other embodiments are also possible. Thus, the process can also be utilized in washing of pulp from a sulfite process or a semi-chemical process, for example, and the changes of equipment then required are clearly apparent for one skilled in the art, while the basic inventive idea remains the same. Moreover, other washing means can be used in the washing steps than those specifically shown, and it is not necessary either that the same type of washing device is used in all the washing steps. What is essential is that the washing can be carried out in accordance with the process defined in the claims.

I claim:

1. A process for washing pulp coming from a digesting stage in a plurality of steps at a pressure above atmospheric in at least one of the steps and wherein washing filtrate from a subsequent step or fresh water is used as a washing liquid in a given step, comprising:
    subjecting the pulp to a plurality of successive washing steps from a first to a last step;
    heat exchanging outgoing washing filtrate from each washing step prior to said last washing step with washing liquid going into a subsequent washing step;
    heat exchanging a part of a filtrate from a second washing step with a filtrate coming from said first washing step;
    combining said part of the filtrate from said second washing step with a cooking liquid conveyed to a digestion processing stage;
    supplying fresh water as a diluting and washing liquid in a next to a last step and said last step;
    heating exchanging said fresh water with said washing filtrate from said first washing step and a washing filtrate from said last washing step;
    heating exchanging gases leaving each washing step subsequent to said first washing step with said fresh water;
    subsequently using said fresh water heat exchanged with said gases as a diluting and washing liquid in the last step, wherein condensates and uncondensably gaseous fractions are formed from said gases subsequent to heat exchanging with said fresh water;
    combining said condensates with a diluting liquid used in each washing step prior to said next to last washing step;
    heat exchanging said uncondensable gaseous fractions with said fresh water; and
    heat exchanging said cooking liquor with incoming pulp to said first washing step.

2. The process of claim 1 and further comprising the steps of:
    heat exchanging the washing filtrate from said first washing step with a diluting and washing liquid to said second step prior to heat exchanging with the part of filtrate from said second step and heat exchanging with said fresh water; and
    subsequent to heat exchanging said washing filtrate from said first washing step with said fresh water, leading said washing filtrate from said first washing step to an evaporation stage.

3. The process of claim 1, and further comprising the step of:

heat exchanging gases leaving the first washing stage with said cooking liquor being led to the digest stage.

4. The process of claim 1, wherein each of the washing steps of the pulp comprises:

washing the pulp in a screw press.

* * * * *

UNITED STATES PATENT AND TRADEMARK OFFICE
CERTIFICATE OF CORRECTION

PATENT NO.   : 4,595,456
DATED        : June 17, 1986
INVENTOR(S)  : Alf O. Andersson It is certified that error appears in the above-identified patent and that said Letters Patent is hereby corrected as shown below:

On the title page:

Under PCT Filed:, change "Apr. 11, 1983" to -- Apr. 11, 1984 --.

Signed and Sealed this

Eighteenth Day of November, 1986

*Attest:*

DONALD J. QUIGG

*Attesting Officer*    Commissioner of Patents and Trademarks